United States Patent [19]

Kaminaka et al.

[11] Patent Number: 4,558,385
[45] Date of Patent: Dec. 10, 1985

[54] THIN FILM MAGNETIC HEAD

[75] Inventors: Nobuyuki Kaminaka; Kenji Kanai, both of Neyagawa; Noboru Nomura, Kyoto, all of Japan

[73] Assignee: Matsushita Electric Industrial Co., Ltd., Osaka, Japan

[21] Appl. No.: 647,259

[22] Filed: Sep. 4, 1984

Related U.S. Application Data

[63] Continuation of Ser. No. 335,579, Dec. 29, 1981, abandoned.

[30] Foreign Application Priority Data

Jan. 9, 1981 [JP] Japan ................................ 56-2344

[51] Int. Cl.$^4$ ............................................... G11B 5/16
[52] U.S. Cl. .................................................. 360/126
[58] Field of Search ............... 360/110, 119, 123, 125, 360/126; 324/249

[56] References Cited

U.S. PATENT DOCUMENTS

| | | | |
|---|---|---|---|
| 3,549,825 | 12/1970 | Trimble | 360/123 |
| 4,190,872 | 2/1980 | Jones, Jr. et al. | 360/125 |
| 4,281,357 | 7/1981 | Lee | 360/125 |

FOREIGN PATENT DOCUMENTS

| | | | |
|---|---|---|---|
| 56-61019 | 5/1981 | Japan | 360/119 |
| 886043 | 11/1981 | U.S.S.R. | 360/123 |

OTHER PUBLICATIONS

"High Track Density Thin-Film Tape Heads", *IEEE Transactions on Magnetics*, vol. Mag-15, No. 3, Jul. 1979, pp. 1130-1134.

*Primary Examiner*—George G. Stellar
*Attorney, Agent, or Firm*—Stevens, Davis, Miller & Mosher

[57] ABSTRACT

In a thin film magnetic head in which a lower magnetic layer is formed on a non-magnetic substrate through a non-magnetic layer, and a conductive layer constituting a signal winding and an upper magnetic layer are formed on the lower magnetic layer, the lower magnetic layer is formed within a recess formed in the non-magnetic layer. The recess may pass through the magnetic layer. The lower magnetic layer formed within the recess in the non-magnetic layer can considerably reduce raised portions associated with respective upper layers so that the thin film magnetic head can be improved in magnetic efficienty and yield rate during manufacture.

7 Claims, 5 Drawing Figures

THIN FILM MAGNETIC HEAD

This application is a continuation of application Ser. No. 335,579, filed Dec. 29., 1981 now abandoned.

BACKGROUND OF THE INVENTION

This invention relates to thin film magnetic heads and more particularly to a thin film magnetic head which is improved in magnetic efficiency and yield rate during manufacture.

A thin film magnetic head as shown in FIG. 1 has hitherto been proposed which comprises a non-magnetic substrate 1, a non-magnetic insulating layer 2 formed thereon, and a lower magnetic layer 3, a plurality of non-magnetic insulating layers 4, 5 and 6, a conductive layer 7, an upper magnetic layer 8 and a protective layer 9 which are formed in succession on the layer 2. For details of such a thin film magnetic head, one may refer to U.S. Pat. No. 4,190,872. In the thin film magnetic head constructed as above, due to the thickness of the lower magnetic layer 3 a stepped or raised region is inevitably built, and without removal of the raised region in the subsequent process of the thin-film formation, the upper magnetic layer 8 has a large step or a level-difference at a portion 40 near the gap, thus causing such a problem that magnetic efficiency is degraded. Further, many difficulties are involved in the manufacture process of the thin film magnetic head having such a large level-difference structure, thus resulting in an extremely degraded yield rate.

If an attempt is made to reduce the level-difference by making the lower magnetic layer 3 thinner, magnetic efficiency will be disadvantageously degraded owing to magnetic saturation. On the other hand, the distance between the lower magnetic layer 3 and the upper magnetic layer 8 is required to be large in order to enhance magnetic efficiency, as described in detail in a publication IEEE TRANSACTIONS ON MAGNETICS, Vol. MAG-15, No. 3, July 1979, page 1130. To make this distance large, it is necessary to make the non-magnetic insulating layers 5 and 6 thick, and then a similar large level-difference structure results, imposing a problem on the formation of the conductive layer 7 and the upper magnetic layer 8.

Furthermore, in the structure proposed in prior art the upper magnetic layer 8 comes in contact with the lower magnetic layer 3 at a back gap portion 41, resulting in a large level-difference there. To mitigate the large level-difference, a separate back magnetic layer 42 is formed on the back gap portion 41 simultaneously with the formation of the lower magnetic layer 3. This inevitably increases the number of manufacture processes.

SUMMARY OF THE INVENTION

This invention solves the above problems by forming a lower magnetic layer within a recess in a non-magnetic layer formed on a substrate so that level differences in respective layers due to the thickness of the lower magnetic layer and successive non-magnetic layers can be reduced, and has for its object to provide a thin film magnetic head which can be improved in magnetic efficiency and yield rate.

DESCRIPTION OF THE PREFERRED EMBODIMENTS

Figure 1:
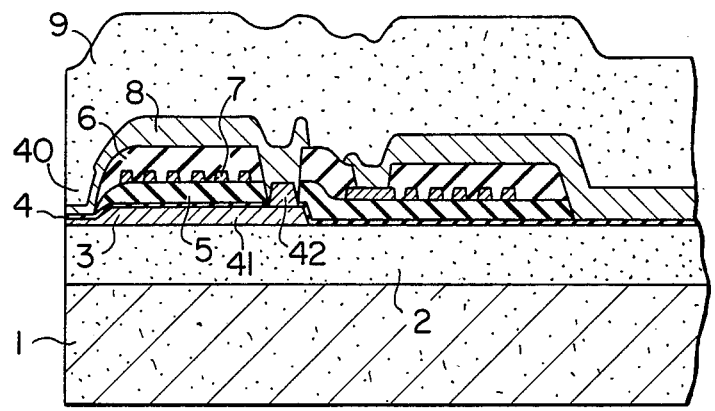
FIG. 1 is a fragmentary sectional view of a prior art thin film magnetic head.
Figure 3:
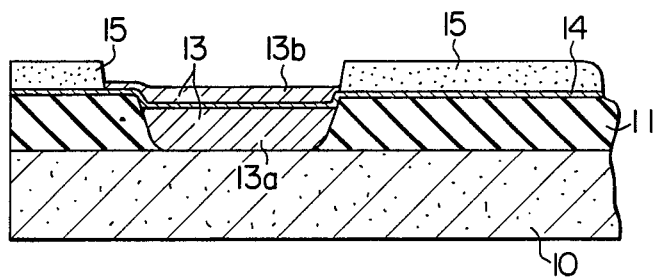
FIG. 3 is a fragmentary sectional view useful in explaining the formation process of a lower magnetic layer of the thin film magnetic head shown in FIGS. 2A and 2B.
Figure 2A:
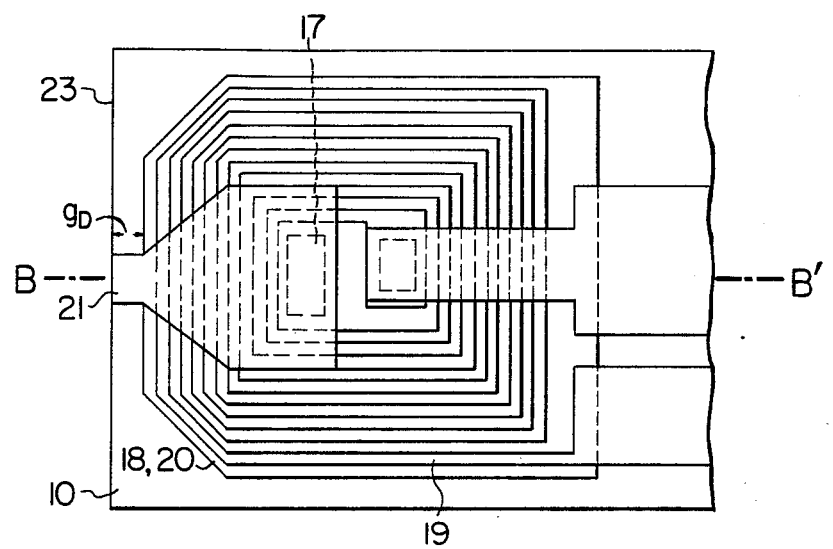
FIG. 2A is a fragmentary plan view showing one embodiment of a thin film magnetic head according to the invention.
Figure 2B:
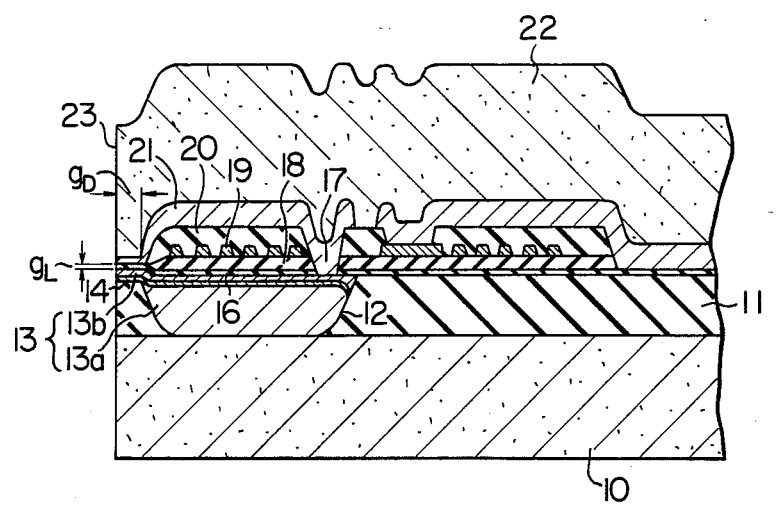
FIG. 2B is a sectional view taken on B-B' in FIG. 2A.

The invention will now be described by way of example with reference to FIGS. 2A, 2B and 3.

A preferred embodiment of a thin film magnetic head according to the invention has a substrate 10 made of a material which can be highly durable against wear throughout frequent contact with a recording modium, the material being, for example, a mixture of $Al_2O_3$ and TiC, ceramics or glass. The substrate 10 is thus non-magnetic in this embodiment but it may be magnetic depending on its fields of uses. The $Al_2O_3$-TiC mixture has a very small electrical resistivity of $3 \times 10^{-2}$ $\Omega$.cm. Thus, when the substrate is used which has a relatively small electrical resistivity of the order of $10^{+2}$ $\Omega$.cm or less, the manufacture process of the thin film magnetic head according to the invention can advantageously be simplified. More particularly, a first non-magnetic insulating layer 11 of $Al_2O_3$, $SiO_2$ or the like is formed on the substrate 10 having relatively small electrical resistivity, and a recess 12 is formed in the first non-magnetic insulating layer 11 at a predetermined portion thereof. The recess 12 may be formed through etching process or lift-off process. Then, an electrode is provided at ends of the substrate 10, and a lower portion 13a of a lower magnetic layer 13 is selectively formed by electrolysis plating within the recess 12, because a surface of the substrate 10 is exposed in the recess and acts as an electrode plane. Subsequently, as shown in FIG. 3, a thin-film layer 14 acting as an electrode plane is deposited to a thickness of 500 to 1000 Å over the entire surface of the layer 11 and the lower portion 13a, and a photoresist layer 15 is patterned. According to the pattern, an upper portion 13b of the lower magnetic layer 13 is formed by electrolysis plating on a predetermined portion and the photoresist layer 15 is then removed. Thereafter, the thin-film layer 14 is partly removed by etching or the like with remainder of a portion thereof interposed between the upper and lower portions 13b and 13a, thus completing the lower magnetic layer 13. In selecting the material of the thin-film layer 14, freedom of choice is large since the thin-film layer 14 is mainly intended to act as the electrode plane for electrolysis plating, and the thin-film layer 14 may be a similar magnetic layer to the lower magnetic layer 13 or a non-magnetic conductive layer of aluminum or the like.

In the course of the above formation process, the substrate 10 having relatively small electrical resistivity can also act as an electrode to facilitate the formation of the portion 13a of the lower magnetic layer 13 by an electrolysis plating process. With the aforementioned substrate, an alternative of process such as vacuum deposition or sputtering may be employed for the formation of the lower magnetic layer 13, but such an alternative not only requires a great number of process steps in the present-day technique but also suffers from unevenness of the surface of the lower magnetic layer 13 and is inferior to the aforementioned electrolysis plating process. If the substrate 10 is made of a material having a large electrical resistivity, an electroless plating process as well as a vapor deposition or sputtering process may be employed to form the lower magnetic layer 13.

The foregoing embodiment has advantages as will be described below.

(1) Since the portion 13a of the lower magnetic layer 13 is disposed in the recess 12 of the first non-magnetic insulating layer 11, the level-difference can be reduced. In view of the fact that portion 13a of the lower magnetic layer 13 is required to be thicker than a portion, close to the recording medium, of the portion 13b in order to suppress magnetic saturation and improve magnetic efficiency in a magnetic circuit involved, the above advantage is very significant and distinguishable over the prior art;

(2) By adjusting the thickness of the first non-magnetic insulating layer 11 or the depth of the recess and the thickness of the lower magnetic layer 13, a very small level difference between a third non-magnetic insulating layer 18 and other layers formerly formed can be realized even though the thickness of the third non-magnetic insulating layer 18 can be increased to a great extent. And thus, excellent formation of a conductive layer 19 on the layer 18 is guaranteed. The sufficiently large thickness of the third non-magnetic layer 18 assists in increasing the distance between the lower magnetic layer 13 and an upper magnetic layer 21 and enhancing recording efficiency considerably;

(3) As a result of the above advantages, the distance between a back gap portion 17 and a forward gap portion or the so-called yoke length can be increased so that the number of turns of a winding conductive layer 19 can be increased without degradation of the efficiency, thereby facilitating low-current writing during recording and high reproduction output during reproducing;

(4) A low level-difference structure thus achieved can eliminate the separate back magnetic layer of the prior art and simplify the manufacture process along with attainment of extremely improved yield rate; and (5) By using the $Al_2O_3$-TiC mixture of small electrical resistivity for the substrate, this substrate per se can act as the electrode for electrolysis plating, thereby simplifying the manufacture process.

On the lower magnetic layer 13 is formed a second non-magnetic insulating layer 16 made of $SiO_2$, $Al_2O_3$ or the like and having a thickness corresponding to a gap length $g_L$. The non-magnetic insulating layer 16 is partly etched off at the back gap portion 17 and the lower magnetic layer 13 is exposed. Subsequently, the third non-magnetic insulating layer 18, the conductive layer 19 constituting a coil portion and a fourth non-magnetic insulating layer 20 are formed, and the upper magnetic layer 21 is formed by plating, vacuum deposition or sputtering process in such a manner that it comes in contact with the lower magnetic layer 13 at the back gap portion 17. Thereafter, a protective layer 22 of $SiO_2$, $Al_2O_3$, SiC or the like is formed which protects the main thin film structure. The thin film structure thus formed is cut, machined and polished at a side surface 23 confronting the recording medium to attain a predetermined gap depth $g_D$ and finished into a specified configuration as desired. If the protective layer 22 alone is insufficient to protect the main thin film structure, an additional protective plate of glass, ceramics, ferrite or the like is bonded to the layer 22 by glass bonding, for example.

The third and fourth non-magnetic insulating layers 18 and 20 may be of an inorganic material such as $SiO_2$ or an organic material such as resist.

Although in the foregoing embodiment the conductive layer 19 is a single layer structure having six turns, the number of turns is of no significance in the present invention. Obviously, teachings of the present invention may be applied to a conductive layer of a multiple layer structure having two or more layers.

Figure 4:
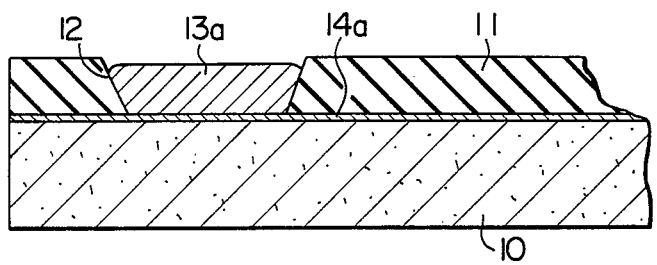
FIG. 4 is a fragmentary sectional view useful in explaining the formation process of a modified lower magnetic layer.

The lower magnetic layer may be modified as shown in FIG. 4. In this modification, a conductive thin-film layer 14a having a thickness of 500 to 1000 Å is formed on a substrate 10 of a large electrical resistivity and a non-magnetic insulating layer 11 is then formed on the layer 14a. Formed in the layer 11 is a recess 12 within which a lower portion 13a of the lower magnetic layer 13 is formed by electrolysis plating on the thin-film layer 14a. Additional layers are applied on the thus formed structure to complete a thin film magnetic head. In this modification, the elimination of the thin-film layer 14a on the substrate 10 may be unnecessary. The thin-film layer 14a, which is made of any conductive materials, is so thin that it does not affect the function of the magnetic head even though the thin-film layer 14a remains in a front portion of the finished head.

As has been described, according to the present invention, the lower magnetic layer is formed within the recess formed in the non-magnetic layer on the substrate to thereby provide the thin film magnetic head wherein the level differences in respective layers due to the thickness of the lower magnetic layer and the successive non-magnetic layers can be reduced. Together with the reduced level differences, the invention can increase the thickness of the lower magnetic layer to thereby provide the thin film magnetic head of high magnetic efficiency at high yield rate.

We claim:

1. In a thin film magnetic head including a non-magnetic layer, a lower magnetic layer, a conductive layer constituting of a signal winding and an upper magnetic layer which are formed on a substrate, the improvement wherein:

said lower magnetic layer is disposed substantially within a recess in said non-magnetic layer, the thickness of said lower magnetic layer being substantially equal to the depth of the recess in said non-magnetic layer, said lower magnetic layer comprising a first portion positioned in the recess and a second portion positioned to be closed to a recording medium on which a read/write operation is to be performed, the thickness of the first portion being substantially equal to the depth of the recess and the second portion being thinner than the first portion; and said conductive layer constituting the signal winding is formed in a single layer on a first insulating layer formed on said lower magnetic layer, and said upper magnetic layer is formed on said conductive layer, a second insulating layer being interposed between said upper magnetic layer and said conductive layer.

2. A thin film magnetic head according to claim 1, wherein said lower magnetic layer is a magnetic layer formed by plating.

3. A thin film magnetic head according to claim 1, wherein the recess in said non-magnetic layer passes therethrough.

4. A thin film magnetic head according to claim 1, wherein said substrate has a resistivity of the order of $10^2$ Ω.cm or less.

5. A thin film magnetic head comprising:
(a) a non-magnetic layer disposed on a substrate and including a recess;
(b) a lower magnetic layer comprising a first portion positioned within said recess, said first portion having a thickness substantially equal to the depth of a deepest portion of said recess, and a second portion positioned close to a recording medium on which a record/playback operation is to be performed, said second portion being thinner than said first portion, the entire upper surface of said second portion being positioned above said non-magnetic layer a distance less than the depth of said deepest portion of said recess;
(c) a first insulating layer formed on said second portion of said lower magnetic layer;
(d) a conductive layer comprising a signal winding formed in a single layer on said first insulating layer;
(e) a second insulating layer formed on said conductive layer; and
(f) an upper magnetic layer formed on said second insulating layer.

6. A thin film magnetic head comprising:
(a) a substrate having a non-magnetic layer thereon;
(b) a lower magnetic layer formed on said substrate through said non-magnetic layer;
(c) a conductive layer comprising a signal winding formed on said lower magnetic layer;
(d) an upper magnetic layer formed on said lower magnetic layer through said conductive layer comprising said signal winding, said lower magnetic layer being disposed within a recess formed in said non-magnetic layer, said lower magnetic layer comprising a first portion positioned in said recess and a second portion positioned close to a recording medium on which a record/pick-up operation is to be performed, the thickness of said first portion being substantially equal to the depth of said recess and said second portion being thinner than said first portion,
(e) a first insulating layer formed on said lower magnetic layer, said conductive layer being formed in a single layer on said first insulating layer formed on said lower magnetic layer, and
(f) a second insulating layer formed on said conductive layer, said upper magnetic layer being formed on said second insulating layer which is interposed between said upper magnetic layer and said conductive layer.

7. A thin film magnetic head comprising:
(a) a substrate;
(b) a non-magnetic layer formed on said substrate and having a recess formed therein;
(c) a lower magnetic layer formed on said non-magnetic layer and positioned within the recess in said non-magnetic layer, the thickness of said lower magnetic layer being substantially equal to the depth of the recess in said non-magnetic layer, said lower magnetic layer comprising a first portion positioned in the recess of said non-magnetic layer and a second portion positioned close to a recording medium on which a record/pick-up operation is to be performed, the thickness of said first portion being substantially equal to the depth of the recess and the thickness of said second portion being thinner than that of said first portion;
(d) a first insulating layer formed on said lower magnetic layer;
(e) a conductive layer comprising a signal winding and formed in a single layer on said first insulating layer;
(f) a second insulating layer formed on said conductive layer; and
(g) an upper magnetic layer formed on said second insulating layer.

* * * * *